United States Patent Office 3,541,121
Patented Nov. 17, 1970

3,541,121
SEPARATION OF ORGANIC ACIDS BY REACTIVE-EXTRACTION WITH AMINES
John W. Crandall and Richard C. Grimm, Charleston, W. Va., assignors to Union Carbide Corporation, a corporation of New York
No Drawing. Filed June 28, 1968, Ser. No. 740,985
Int. Cl. C11c 1/00
U.S. Cl. 260—419         16 Claims

ABSTRACT OF THE DISCLOSURE

Higher organic acids (those containing 4 to 16 carbon atoms in their carbon chain) can be separated from the products of partial oxidation of aliphatic hydrocarbons containing 1 to 16 carbon atoms. These partial oxidation products (known as "oxidate") are first washed with water to remove the lower acids (those containing 1 to 3 carbon atoms). The water-washed oxidate is then contacted with an amine or ammonia to form the corresponding amine-acid (or ammonia-acid) complexes. These complexes are then thermally decomposed to liberate the acids therefrom.

---

This invention relates to the separation of organic acids from the products of partial oxidation of paraffins. It is particularly related to the use of amines for the separation of higher acids from such partial oxidation products.

It is well known that certain petroleum fractions such as heavy naphthas and crude waxes contain a mixture of paraffins having one to about sixteen carbon atoms. Partial oxidation of these paraffins results in the production of incomplete oxidation products such as acids, aldehydes, esters, ketones and alcohols. The partial oxidation is generally carried out in the vapor phase or in the liquid phase, with or without a catalyst.

The lower acids (those containing one to three carbon atoms) in the partial oxidation products may be conveniently separated by water washing and subsequent recovery of these acids by conventional techniques. The remainder which will hereinafter be referred to as "oxidate" consists mainly of the higher acids) those containing four to about sixteen carbon atoms), some unreacted paraffins and the foregoing partial oxidation products. The recovery of the higher acids is extremely desirable since they can be hydrogenated to the corresponding alcohols which are useful in the manufacture of plasticizers, detergents and soaps. It is therefore necessary that these acids be separated in high purity so that they may be used for these applications. This invention therefore is specifically concerned with the separation of these higher acids from such oxidates.

The conventional method of separation of such higher acids has heretofore involved treatment of the oxidate with sodium hydroxide which combines with the acids to form the corresponding water-soluble salts. This of course results in complete utilization and loss of the sodium hydroxide. A mineral acid such as sulfuric acid can be employed to liberate the acids from the sodium salts. The use of a mineral acid however presents salt-handling and salt-disposal difficulties. Furthermore the mineral acid which is employed in this process cannot be recovered for reuse and is therefore permanently lost from the system. Accordingly this method is both cumbersome and industrially uneconomical.

It has now been discovered that the higher acids contained in such oxidates can be effectively separated from the other components by treatment of the oxidate with an organic amine or ammonia, preferably with an amine. According to this invention the oxidate is contacted, in the liquid phase, with an aqueous solution of the amine thereby forming the complexes of the acids with the amine. These complexes are subsequently thermally decomposed to liberate the acids and recover the amine for further use.

The process of this invention broadly comprises contacting the aqueous solution of the amine with the oxidate in any suitable contacting zone such as a tray column, a packed tower, rotating disk contactor or any other contacting device. This operation may be conducted continuously, semi-continuously or in a batch-wise manner although, obviously, continuous operation is preferable from an industrial standpoint. When operating in a continuous manner the aqueous solution of the amine is generally introduced near the top and the oxidate is introduced near the bottom of the contacting zone. The two streams will then flow in a counter-current manner in the contacting zone and the amine-acid complexes are formed upon contact of the two streams. The complexes are simultaneously extracted by water and an aqueous phase containing these complexes is removed from the bottom of the contacting zone and an oil-phase containing the remaining partial oxidation products of the oxidate is removed overhead.

It is in view of the reaction of the amine with the acid to form the corresponding amine-acid complexes and the simultaneous extraction of these complexes in water that this process is referred to as reactive-extraction.

The aqueous phase which is withdrawn from the contacting zone is subjected to thermal decomposition at a suitable decomposition temperature in order to liberate the acids from the amine. Thus the acids are recovered in high quality and essentially free from other contaminating materials and the amine which is thus recovered is recycled to the contacting zone for further use.

The amines which are suitable for the process of this invention are the primary, secondary and tertiary aliphatic, heterocyclic and aromatic amines. The order of the effectiveness of these amines is tertiary amine, secondary amines and primary amines, respectively.

The preferred amines are those conforming to the general formula:

wherein $R_1$ is an alkyl radical haivng 1 to 5 carbon atoms, preferably 1 to 2 carbon atoms; $R_2$ and $R_3$ may be hydrogen or an alkyl radical containing 1 to 5 carbon atoms, preferably 1 to 2 carbon atoms and wherein $R_1$, $R_2$ and $R_3$ need not all be the same.

It has been further discovered that the tertiary aliphatic amines, particularly trimethylamine and triethylamine, are most preferable for the process of this invention.

The amines which are particularly useful in the process of this invention are those which are essentially completely soluble in water, form acid complexes which are also essentially soluble in water and which complexes can be readily decomposed to liberate the acids from the amine, and must have a boiling point which is lower than the C₄ acid in the oxidate. A minimum boiling point difference of at least about 30° C. is particularly advantageous and facilitates the separation of the acids from the amine in the decomposition zone.

The most effective amines have been found to be the tertiary amines particularly trimethylamine and triethylamine. These tertiary amines are especially preferred since they do not contain any active hydrogen in their molecule. The presence of active hydrogen in the molecule is believed to be responsible for side reactions which will produce undesirable complexes and products which are difficult to separate from the acids and therefore result in the recovery of lower quality acids.

The amines which are employed in this process are generally dissolved in water or some other suitable solvent, although water is preferred. When using solvents other than water, the solvent must be inert toward all the components in the oxidate and must be capable of preferentially dissolving the amine as well as the amine-acid complexes rather than the other partial oxidation products or the paraffins. Exemplary suitable solvents include acetonitrile, dimethyl sulfoxide and dimethylformamide and the like.

The optimum concentration of the amine in the solution generally depends upon the particular amine which is employed. Thus the amine concentration can range from about 2 weight percent to about 50 weight percent, preferably from about 5 weight percent to about 30 weight percent of the solution.

The relative amounts of the amine and the acids in the contacting zone are not per se critical in this invention. Thus the amine may be employed in less than stoichiometric, stoichiometric or greater than the stoichiometric amount necessary for the reaction with the higher acids in the oxidate. However, it has been discovered that higher quality acids can be recovered when the amount of the amine in the contacting zone is less than such stoichiometric amount.

The desired temperature and pressure are so selected that the materials in the contacting zone remain essentially in the liquid phase. In general, this temperature can generally range from about 0° C. to about 100° C., preferably from about 10° C. to about 60° C. and the pressure can generally vary from about 5 p.s.i.a. to about 200 p.s.i.a., preferably from about 15 p.s.i.a. to about 50 p.s.i.a.

As it was previously mentioned, the amine-acid complexes can be thermally decomposed to liberate the acids and recover the amine for recycle to the contacting zone. Thus the aqueous phase which is withdrawn from the contacting zone is subjected to a temperature of from about 50 C. to about 300° C., preferably from about 100° C. to about 200° C. in a distillation zone wherein the acids are liberated from the amine and withdrawn from the bottom of this zone. The amine together with the solvent (usually water) are distilled overhead and recycled to the contacting zone.

The pressure in this thermal decomposition-distillation zone is not per se critical and may generally vary from about 5 p.s.i.a. to about 200 p.s.i.a., preferably from about 15 p.s.i.a. to about 50 p.s.i.a.

Alternatively, the amine-acid complexes in the aqueous phase withdrawn from the contacting zone may be contacted with a stronger acid such as sulfuric acid, hydrochloric acid and the like, thereby liberating the higher acids from the amine. However, the amine in this case will be difficult to recover thus rendering this procedure less attractive and even uneconomical.

Although the process of this invention has heretofore been described using amines for reactive-extraction of the higher acids in the oxidate, it has been found that an aqueous solution of ammonia can be similarly employed. The ammonia will also react with these higher acids to form the ammonia-acid complexes from which the acids can be liberated by thermal decomposition or treatment with a strong acid as hereinbefore described. It should be stated, however, that tertiary amines, particularly trimethylamine and triethylamine have been found to be superior to ammonia as well as other amines and result in the recovery of higher quality acids.

The process of this invention will now be further illustrated by the following examples.

EXAMPLE 1

Approximately four liters of a mixture (oxidate) containing aliphatic hydrocarbons, organic acids, ketones, alcohols and esters, each containing 6 to 16 carbon atoms in the carbon chain, together with 500 ml. aqueous ammonia (28 weight percent) and 1500 ml. water were charged to a large kettle. The mixture was agitated at room temperature (25° C. to 30° C.) and 14.7 p.s.i.a. for approximately 3 minutes and separated into two layers, a lower aqueous phase and an upper oil phase. The lower aqueous phase (approximately 2620° ml.) was charged to a three-liter kettle and distilled at atmospheric pressure to remove the ammonia and water. The overhead temperature during this distillation was 85° C. to 102° C., rising rapidly to 150° C.–200° C. after removal of the ammonia and water.

Approximately 457 grams of residues (regenerated acids) was recovered from this kettle and its acid number determined to be 150 as compared to an acid number of 44 of the original feed, thus indicating that the acids were concentrated approximately 3.4 fold in this operation.

The "acid number" in this example as well as in the subsequent examples refers to the milligrams of potassium hydroxide which is required to neutralize the free acid in a one-gram sample.

EXAMPLE 2

Approximately 800 ml. of a mixture containing aliphatic hydrocarbons, acids, ketones, alcohols and esters each containing 6 to 16 carbon atoms in the carbon chain was contacted with 200 ml. of aqueous (25 weight percent) trimethylamine in a separatory funnel at room temperature (25° C. to 30° C.) and shaken gently. Two layers were observed in the separatory funnel, a lower aqueous layer and an upper oil phase. The lower water-rich layer (aqueous phase) was charged to a laboratory distillation flask and distilled batchwise at 14.7 p.s.i.a. without reflux. Trimethylamine and water were removed as distillate until the overhead vapor temperature was 150° C.

Approximately 84 gms. of residue (regenerated acids) was removed from the kettle and its acid number was determined to be 147 as compared to an acid number of 32.5 of the feed, thus indicating that the acids were concentrated 4.4 fold as compared to 3.4 in Example 1.

EXAMPLE 3

This example illustrates the continuous, counter-current reactive-extraction of the higher acids with trimethylamine.

Approximately 11,124 gms. of a mixture of aliphatic hydrocarbons, acids, ketones, alcohols and esters, each having 6 to 16 carbon atoms in its carbon chain was introduced at the rate of 930 grams per hour to the bottom of a multistage, York-Scheibel extraction column having 1-inch inside diameter and equipped with 11 equidistantly spaced paddles. Approximately 4355 gms. of an aqueous solution of trimethylamine (containing 12 weight percent of the amine was introduced to the top of the column at the rate of approximately 365 grams per hour, and the two streams were contacted counter-currently at a temperature of 25° C. to 30° C.

A raffinate stream (oil-rich phase having an acid number of 0.41 was withdrawn from this column as compared to an acid number of 33 for the feed, thus indicating that approximately 99 weight percent of the acid in the feed has been removed. The extract (aqueous phase) from this column which amounted to approximately 6024 gms. was distilled batchwise in a laboratory distillation column equipped with five actual trays, at atmospheric pressure and to a reflux-to-make ratio of 1.0 until the overhead temperature reached 160° C.

Approximately 1408 gms. of residues (regenerated acids) having an acid number of 254 were recovered from this distillation column.

This indicates that the acids have been concentrated 7.7 times and that the regenerated acids represents 12.7 weight percent of the original feed.

EXAMPLE 4

The feed in this example was a mixture of aliphatic hydrocarbons, acids, ketones, alcohols and esters each having 4 to 16 carbon atoms in the carbon chain. The feed which had an acid number of 35 was introduced, at the rate of 400 ml. per hour, to the bottom of a column having 1.5-inch inside diameter and packed with 40 inches of 6-mm. glass Raschig rings. The feed was contacted with a 15 weight percent aqueous solution of diisopropylamine (using 20 percent molar excess of the amine) which was introduced at the top of the column.

The extract (aqueous phase) from from the above column was distilled batchwise in a distillation column at atmospheric pressure until an overhead temperature of 150° C. was reached. The amine and water were removed overhead from this distillation column and the acid number of the residue (regenerated acids) from this distillation step was determined to be 254 indicating that the acids have been concentrated approximately seven fold from the original feed.

EXAMPLE 5

Example 4 was repeated except that the amine used was piperidine. Otherwise the reactive-extraction step and the distillation step were carried out under essentially identical conditions.

The acid number of the regenerated acids recovred in this example was 226 indicating that the acids in the feed have been concentrated approximately 6.5 times.

It should be emphasized that high recovery of acids is extremely desirable. These acids must have a high acid number, low nitrogen content and low percent residues to be suitable for their intended applications. The following examples will illustrate the superior quality acids which can be recovered by the use of trimethylamine as compared to ammonia as the reactive-extractant.

EXAMPLES 6 AND 7

Approximately 10,419 grams of a mixture of aliphatic hydrocarbons, organic acids, ketones, alcohols and esters, each containing 4 to 16 carbon atoms in its carbon chain, and having an acid number of 33 was fed at the rate of about 1900 grams per hour to the bottom of a York-Scheibel column equipped with 11 stages. Approximately 1840 grams of an aqueous 14 weight percent solution of ammonia was also fed to the top of this column at the rate of about 360 grams per hour and the tow streams were contacted countercurrently at 25° C. to 30° C. The extract (aqueous phase) containing the ammonia-acid complexes, from this column was introduced to the second tray of a 5-tray Oldershaw column and distilled batchwise at atmospheric pressure, to an overhead temperature of 160° C. and at a reflux-to-make ratio of 1:1. The solvent and water were removed overhead and the regenerated acids were removed from the bottom of the Oldershaw column.

Example 6 was repeated except that the feed employed was 11,124 grams and the solvent was 4355 grams of 12 weight percent aqueous solution of trimethylamine (TMA) at substantially the same respective rates employed in Example 6. The results of these examples are shown in Table I below.

TABLE I

| | Examples | |
|---|---|---|
| | 6 | 7 |
| Reactive-Extraction Step: | | |
| Continuous phase | (¹) | (¹) |
| Temperature, ° C | 25–30 | 25–30 |
| Pressure, p.s.i.a | 14.7 | 14.7 |
| Acid number of feed | 33 | 33 |
| Solvent | (²) | (³) |
| Raffinate, grams | 8,886 | 9,754 |
| Extract phase, grams | 3,228 | 6,024 |
| Acid number of raffinate | 1.84 | 0.41 |
| Nitrogen content of raffinate, p.p.m.⁴ | 676 | 5,000 |
| Distillation Step: | | |
| Temperature, ° C. (overhead) | 160 | 160 |
| Pressure, p.s.i.a | 14.7 | 14.7 |
| Regenerated acids, grams | 1,275 | 1,408 |
| Acid number of regenerated acids | 212 | 254 |
| Nitrogen content of regenerated acids, weight percent⁴ | 2.5 | 1.0 |

¹ Oil.
² Ammonia.
³ TMA.
⁴ Analyzed by modified Kjeldahl method.

It will be observed from Table I that the regenerated acids recovered in Example 7 (using trimethylamine) have higher acid numbers and lower nitrogen content than the corresponding acids recovered by using ammonia as the reactive-extractant. Furthermore, when the regenerated acids were distilled under similar conditions, approximately 4.6 weight percent residues were obtained in Example 7 as compared to 19.2 weight percent in Example 6.

EXAMPLE 8

This example illustrates the use of triethylamine as the reactive-extractant in the process of this invention.

The feed in this example was an equal volume mixture of triethylamine and oxidate (aliphatic hydrocarbons, organic acids, ketones, alcohols and esters, each having 6 to 16 carbon atoms in its carbon chain). Approximately 19,940 ml. of this feed was introduced at the rate of 620 ml. per hour to the middle of a York-Scheibel column equipped with 11 stages. Also, about 4520 ml. of water was introduced to the top of this column at the rate of 140 ml. per hour and approximately 9615 ml. of triethylamine was fed to the bottom of the column at the rate of 280 ml. per hour. The temperature in this column was maintained at 25° C. to 30°C.

Approximately 4063 grams of raffinate (oil phase) and 4355 grams of extract (aqeous phase) were withdrawn from the top and bottom of the column, respectively. The extract was continuously distilled in a distillation column equipped with 5 actual trays, at approximately 14.7 p.s.i.a., a reflux-to-make ratio of 1:1 and at overhead and kettle temperatures of 95° C. and 150° C., respectively.

Approximately 970 grams of regenerated acids was recovered from the bottom of the distillation column. The acid number of these acids was determined to be 291 as compared to an acid number of 35.5 for the feed, thus indicating that the acids have been concentrated approximately eight fold.

Although the process of this invention has heretofore been described and illustrated in connection with the separation of higher organic acids from the products of partial oxidation of aliphatic hydrocarbons, it should be emphasized that this process is equally applicable to the separation of aliphatic organic acids containing 4 to about 16 carbon atoms from a mixture which contains at least one of these acids together with at least one of the aforesaid partial oxidation products and the aforesaid aliphatic hydrocarbons. Thus such mixtures may contain any one or more of these acids together with a ketone, alcohol, ester, ether, aliphatic hydrocarbon or any combination thereof.

Also, while the process of this invention has been described and illustrated in connection with the separation of aliphatic acids, it may be adapted for the separation of other organic acids from mixtures containing the same so long as the acid can react with the amine to form an amine-acid complex from which the acid can be readily liberated.

What is claimed is:

1. A process for separating organic acids containing 4 to 16 carbon atoms from a mixture containing at least one of said organic acids with at least one component selected from the group consisting of aliphatic hydrocarbons, alcohols, ketones, esters and ethers each containing 1 to about 16 carbon atoms, which process comprises the steps of:
   (a) contacting, in a contacting zone, said mixture with an amine conforming to the general formula:

wherein $R_1$, $R_2$, and $R_3$ are alkyl radicals having 1 to 5 carbon atoms,
   (b) maintaining the materials in said contacting zone essentially in the liquid phase, and
   (c) withdrawing the amine-higher acid complex formed in said contacting zone and recovering said higher acid from said complex.

2. The process of claim 1 wherein said amine is employed as an aqueous solution containing from about 2 to about 50 weight percent of amine.

3. The process of claim 2 wherein said amine is employed as an aqueous solution containing from about 5 to about 30 weight percent of amine.

4. The process of claim 2 wherein the higher acid is recovered from the complex by thermal decomposition.

5. The process of claim 4 wherein thermal decomposition is effected at about 50° C. to about 300° C.

6. The process of claim 5 wherein the amine is trimethylamine.

7. The process of claim 5 wherein the amine is triethylamine.

8. The process of claim 1 wherein $R_1$, $R_2$, and $R_3$ are alkyl radicals having 1 to 2 carbon atoms.

9. The process of claim 8 wherein said amine is employed in the form of an aqueous solution containing from about 2 to about 50 weight percent of amine.

10. The process of claim 9 wherein said amine is employed in the form of an aqueous solution containing from about 5 to about 30 weight percent of amine.

11. The process of claim 8 wherein said amine is trimethylamine.

12. The process of claim 11 wherein said amine is employed in the form of an aqueous solution containing from about 2 to about 50 weight percent of amine.

13. The process of claim 12 wherein said amine is employed in the form of an aqueous solution containing from about 5 to about 30 weight percent of amine.

14. The process of claim 8 wherein said amine is triethylamine.

15. The process of claim 14 wherein said amine is employed in the form of an aqueous solution containing from about 2 to about 50 weight percent of said amine.

16. The process of claim 14 wherein said amine is employed in the form of an aqueous solution containing from about 5 to about 30 weight percent of said amine.

References Cited

UNITED STATES PATENTS

| | | | |
|---|---|---|---|
| 2,686,794 | 8/1954 | Clayton | 260—403 |
| 2,951,859 | 9/1960 | Skav et al. | 260—419 |
| 3,151,139 | 9/1964 | Van der Plas | 260—419 |

LEWIS GOTTS, Primary Examiner

E. G. LOVE, Assistant Examiner

U.S. Cl. X.R.

260—501.1